Jan. 28, 1964 M. A. MAYHEW 3,119,922
CONSTANT HEAT SEALER
Filed June 12, 1961
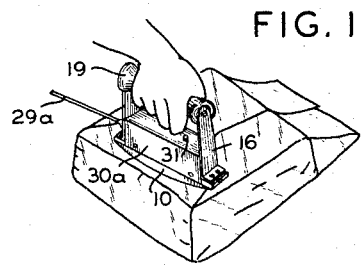
FIG. 1
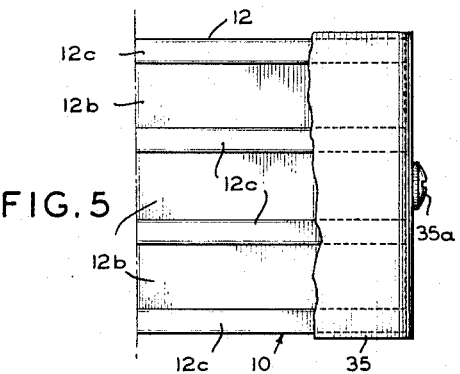
FIG. 5
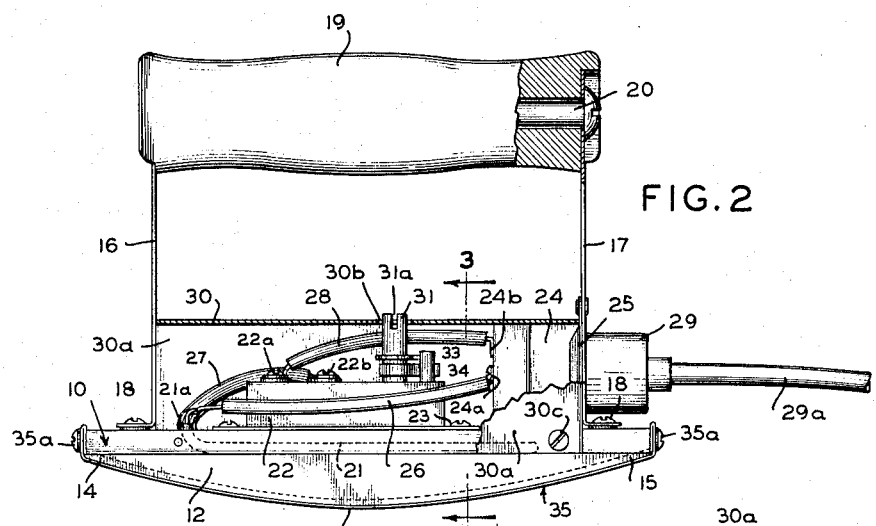
FIG. 2
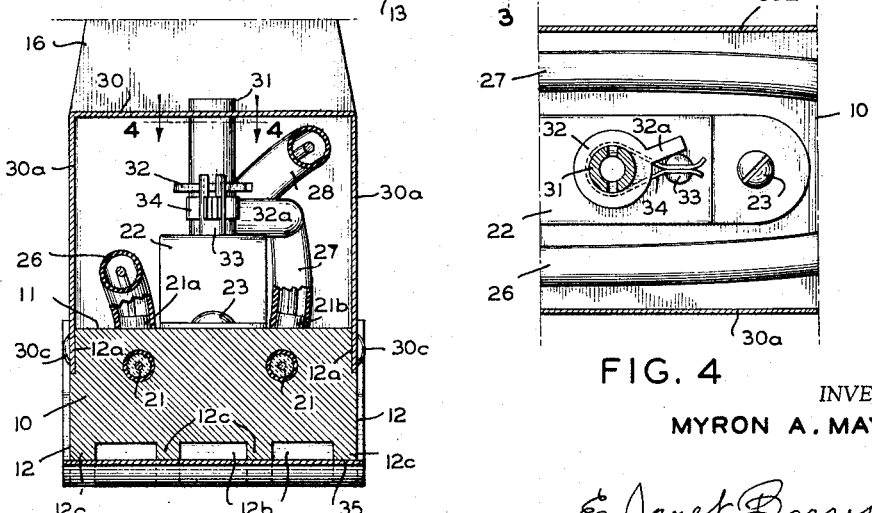
FIG. 3
FIG. 4
INVENTOR
MYRON A. MAYHEW
BY E. Janet Berry
ATTORNEY

United States Patent Office 3,119,922
Patented Jan. 28, 1964

3,119,922
CONSTANT HEAT SEALER
Myron A. Mayhew, Rochester, N.Y., assignor to National Distillers and Chemical Corporation, New York, N.Y., a corporation of Virginia
Filed June 12, 1961, Ser. No. 116,500
3 Claims. (Cl. 219—21)

This invention relates to a novel process and apparatus for the sealing of thermoplastic films and more particularly to the sealing of multiple layers of thermoplastic film to itself. While the invention has utility in many fields, it is particularly directed to the sealing of such films on so-called "soft packages" such as laundry, towels, articles of wearing apparel, and the like.

Olefin films of the character with which we presently are concerned, such as the polyethylene, polypropylene, and the like, are relatively thin, ranging in thickness from approximately three-quarters mil to approximately six mils (0.00075" to 0.006") and the use thereof as a commercial wrapping material continues to increase in importance.

Packages wrapped therewith, and particularly so-called "soft packages" where the contents are open to inspection, are particularly attractive from the consumer point of view and present many commercial advantages. The satisfactory wrapping thereof however, where a complete and uniform seal was obtained, having attractive appearance and without excessive shrinkage, has presented serious problems.

Careful control of heat and pressure, with prior art sealing devices, has been a prerequisite to the production of acceptable package. Where insufficient conditions of heat existed, inadequate seals occurred with resultant parting of the seal under handling conditions and the spilling of contents. Where the heat was excessive, either melting of the film took place, producing an inferior seal subject to ready rupture, or burn-through resulted with loss of film and possible damage to contents. Under such conditions, skilled and experienced operators were required to insure the production, at an acceptable rate of speed, of satisfactory packages. Even under the best of such conditions, relatively minor temperature variances in the sealer, occasioned by differences in actual contact time during successive sealing operations or otherwise, affected adversely the uniformity of packages thus produced.

Accordingly, it is a major purpose of the present invention to provide a novel sealing device of the character with which we here are concerned which will effectively seal multiple layers of thermoplastic film to itself.

It is a further object of the invention to provide a novel sealer having adjustability as to the temperature of the sealing surface and where such temperature will remain constant and not be affected to any appreciable extent either during actual sealing or a delay between successive operations or packages.

It is a still further object of the present invention to provide a sealer of the class set forth having a novel sealing surface whereby a distinctive seal of ornamental appearance and maximum efficiency may be obtained.

It is a further object of the present invention to provide a novel method and manner of use of a heat sealer whereby multiple layers of thermoplastic film may be sealed to itself with maximum efficiency, during the commercial wrapping of packages, without requiring skilled or experienced operators.

It is a still further object of the present invention to provide a novel sealing device of the class set forth which may be manufactured with particular economy, is strong and durable, and will function with maximum uniformity and efficiency without requiring skilled or experienced operators.

Further objects and advantages of the invention will be readily apparent from the following description taken in conjunction with the accompanying drawing wherein:

FIGURE 1 is a perspective view of a novel sealer constructed in accordance with the present invention illustrating the sealing of a typical package;

FIGURE 2 is a side elevational view of the sealer illustrated in FIGURE 1, parts being broken away for clarity;

FIGURE 3 is a vertical sectional view taken on the line 3—3 of FIGURE 2;

FIGURE 4 is a fragmentary horizontal sectional view taken on the line 4—4 of FIGURE 2;

FIGURE 5 is a fragmentary bottom plan view illustrating a portion of the sealing surface per se, parts being broken away.

Briefly stated, the novel sealing device of the present invention desirably is manually operated and includes a sealing portion having thermostatic or other means for effectively controlling the temperature thereof, the sealing surface per se being arcuate and a rocking motion of the sealer, contacting the layers of thermoplastic material, effects the seal. In this manner any sliding movement of the sealer over the thermoplastic film, and the decided disadvantages inherent thereto, is obviated.

As shown in the drawing, the novel sealing device of the present invention comprises a metallic body portion 10 of generally rectangular configuration having a substantially horizontally disposed upper surface 11, depending side wall portions 12 and an arcuate or convex sealing surface 13, this sealing surface terminating at its forward extremity in a toe portion 14 and at its rearward extremity in a heel portion 15.

Spaced brackets 16 and 17 are secured to the body 10 by suitable fastening means such as screws or the like 18 and a handle portion 19, desirably formed from any suitable non-heat-conducting material, is mounted between said brackets, at a point remote from the body or sealer 10, and securely retained in position by any desired means as a bolt or the like 20.

The sealer body 10 is heated by conduction from an electrical element 21 suitably housed within the sealer. As illustrated, the electrical element 21 may be of generally U-shaped configuration, electrically insulated from the body 10, and the extremities 21a and 21b project above the upper surface 11 of the sealer as illustrated more particularly in FIGURE 3 of the drawing.

A thermostat 22, of well known construction, is secured to the upper surface 11 of the sealer body 10 by suitable fastening means, as screws or the like 23, and an electrical receptacle 24 including a base plate 25 is mounted upon the bracket 17. An electrical conductor 26 connects the extremity 21a of the electrical element 21 with one contact 24a of the receptacle 25 and a similar conductor 27 connects the extremity 21b with one contact 22b of the thermostat 22. A third conductor 28 connects the contact 22a of the thermostat with the contact 24b of the receptacle 24. The arrangement is such that a conventional plug 29 may be received within the receptacle 24 and electrical current derived through wiring 29a from any source (not shown).

A cover plate 30 may be provided, of U-shaped configuration, to enclose the thermostat 22, the receptacle 24, and the associated wiring to guard against inadvertent contact therewith. Desirably this cover plate includes depending side wall portions 30a and the top surface of the cover plate is provided with an aperture 30b through which the control shaft 31 of the thermostat 22 projects for convenient access and adjustment.

Preferably the upper portions of the side walls 12 of the sealer body 10 are recessed as illustrated at 12a and the lower extremities of the depending side wall portions 30a of the cover plate 30 seat within the recesses 12a, machine screws or the like 30c being employed to secure the cover plate in position.

The thermostat 22 functions to maintain the temperature of the sealer constant at the desired level during operating conditions in accordance with the specific wrapping material being employed as well as the nature of the package per se. The thermostat control shaft 31 is rotatable for ready adjustment and has fixedly secured thereto a ring member 32 including a projecting finger 32a positioned for engagement with the stop pin 33 to limit or restrict rotative adjustment of the control shaft in either direction. Desirably the stop pin 33 is split in a vertical direction and receives therein the extremties of a spring clip 34 which embraces the control shaft 31 and prevents inadvertent rotation thereof as by vibration or otherwise. The upper extremity of the control shaft 31 is bifurcated as illustrated at 31a to permit ready engagement as by a coin, screw-driver or other tool, to provide for ready and convenient adjustment as may be desired or required between a high and low position.

While the sealing surface 13 may be continuous, whereby the transverse extent or width of the seal will be determined by the width of this surface, it has been found to be advantageous to provide a multiplicity of spaced ribs extending longitudinally of the sealer in parallel relationship. Thus, the sealing surface 12 may be provided with a plurality of grooves 12b disposed in parallel relationship and providing rib portions 12c. It is these rib portions, which are relatively narrow in the transverse direction, which effect a plurality of spaced, parallel seals upon each operative engagement of the device and provide a highly efficient seal, between superimposed layers of thermoplastic film, of unique and ornamental appearance and which has been found to be far more satisfactory than a single conventional seal of transverse extent equal to the entire width of the present sealer.

If desired, the sealing surface per se may be covered with a layer of flexible material 35, such as Teflon impregnated glass cloth or the like, to prevent actual contact between the metallic sealer and the thermoplastic film with possible adherence and distortion of the film resulting. This is considered necessary with prior art devices particularly where the sealer moves laterally over the film or contacts a substantial area thereof. However, with the present invention, where sealing is accomplished through a rocking motion in a manner to be described more fully hereafter, any possibility of adherence as between film and sealing surface is substantially eliminated. As illustrated more particularly in FIGURES 2 and 5 of the drawing, the flexible member 35 may be secured to the end surfaces of the toe 14 and heel 15 of the sealer by screws or the like 35a whereby ready detachment, or positioning, may be accomplished.

The operation of the present sealer is particularly simple and, as stated hereabove, no especial skill or experience is required in connection with efficient use thereof even in connection with so-called "soft packages" (laundry and the like) where the layers of film to be sealed are supported only by the package contents.

It is necessary only to connect the sealer to a suitable source of electrical energy and provide sufficient time for the sealer to reach the desired temperature. During this brief interval the sealer may be placed upon a suitable support, not shown, and the sealer, desirably, is preset to the proper temperature for normal operation. Thus, with thermoplastic film having a thickness or gauge from three-quarters mil to one and one quarter mils a temperature range from approximately 200° to approximately 290° F. has been found desirable.

When a package P is ready for sealing, the sealer is applied to the superimposed layers of thermoplastic film heel portion 15 first and rocked quickly toward the toe portion 14, without exerting undue pressure, in rocking chair fashion and removed from contact with the film in one continuous movement. This has been illustrated, somewhat diagrammatically, in FIGURE 1 of the drawing. A complete seal will be accomplished, for the full extent of each of the sealing ribs 12 without any danger of burn-through or melting of the wrapping film. For films of greater thickness (so, too, with varying thermoplastic materials) comparable adjustments as to temperature, and duration of actual contact time, present no problems. The temperature of the sealer will remain constant, in accordance with thermostatic adjustment, and will not vary during instant of application or time lapse therebetween.

There has just been described a novel sealer, of the constant heat type, which may be manufactured with particular economy and will function with maximum efficiency, and a novel sealing method. However, the invention is not considered limited to the specific embodiment thereof illustrated and described and reference is therefore had to the claims for summaries of the novel features of the invention and method, novel details of construction, and novel combinations of parts, for all of which protection is desired.

What is claimed is:

1. A constant temperature device for heat sealing layers of thermoplastic film to itself comprising in combination a sealing body of heat conducting material, said body including an upper horizontally disposed flat surface, a lower longitudinally convex sealing surface and vertically disposed side wall portions, an inverted U-shaped cover plate for the intermediate portion of said body, the upper portions of said side wall portions being recessed for the reception of the extremities of the depending legs of said cover plate, an upwardly directed centrally located bracket mounted upon the upper surface of said sealing body adjacent each extremity thereof and a longitudinally disposed handle extending in parallel relationship substantially the entire length of said body secured between the upper free extremities of said brackets, an electrical heating element mounted within said body for heating the same, means for supplying electrical energy to said heating element, thermostatic means mounted upon the upper surface of said body for controlling the temperature thereof, said thermostatic means including an adjustable control which projects through an aperture provided in the upper face of said cover plate, and means for detachably securing said cover plate to said body, said sealing face being provided with a plurality of spaced parallel grooves of substantial depth defining a plurality of relatively narrow convex sealing ribs disposed in parallel relationship and extending the full length of said sealing face.

2. A device as set forth in claim 1 where said sealing face is provided with a flexible sheet material cover.

3. A device as set forth in claim 1 where said sealing face is provided with a detachable Teflon impregnated glass cloth cover.

References Cited in the file of this patent

UNITED STATES PATENTS

| 1,037,218 | Dirnberger | Sept. 3, 1912 |
| 1,946,569 | Clark | Feb. 13, 1934 |
| 2,484,566 | Hiller et al. | Oct. 11, 1949 |
| 2,703,133 | Payton | Mar. 1, 1955 |
| 2,712,343 | Stanton | July 5, 1955 |
| 2,768,272 | Lesher | Oct. 23, 1956 |
| 2,814,710 | Schultze | Nov. 26, 1957 |

FOREIGN PATENTS

| 12,119 | Great Britain | of 1910 |
| 834,882 | Great Britain | May 11, 1960 |